United States Patent
Valsecchi et al.

(10) Patent No.: US 10,442,893 B2
(45) Date of Patent: Oct. 15, 2019

(54) (PER)FLUOROPOLYETHER POLYMERS

(71) Applicant: SOLVAY SPECIALTY POLYMERS ITALY S.P.A., Bollate (IT)

(72) Inventors: Roberto Valsecchi, Verdellino (IT); Rosaldo Picozzi, Cesate (IT); Giovanni Simeone, Solaro (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 0 days.

(21) Appl. No.: 15/743,139

(22) PCT Filed: Jul. 7, 2016

(86) PCT No.: PCT/EP2016/066077
§ 371 (c)(1),
(2) Date: Jan. 9, 2018

(87) PCT Pub. No.: WO2017/005834
PCT Pub. Date: Jan. 12, 2017

(65) Prior Publication Data
US 2019/0106538 A1    Apr. 11, 2019

(30) Foreign Application Priority Data
Jul. 9, 2015 (EP) .................................... 15175979

(51) Int. Cl.
| | | |
|---|---|---|
| C08G 65/00 | (2006.01) |
| G11B 5/00 | (2006.01) |
| C10M 107/00 | (2006.01) |
| C08G 65/333 | (2006.01) |
| C08G 65/335 | (2006.01) |
| G11B 5/725 | (2006.01) |
| C10M 107/38 | (2006.01) |

(52) U.S. Cl.
CPC ......... *C08G 65/007* (2013.01); *C08G 65/335* (2013.01); *C08G 65/3351* (2013.01); *C08G 65/33306* (2013.01); *G11B 5/725* (2013.01); *C10M 107/38* (2013.01)

(58) Field of Classification Search
CPC .. C08G 65/007; C08G 65/3351; G11B 5/725; C10M 107/38
See application file for complete search history.

(56) References Cited

U.S. PATENT DOCUMENTS

| | | |
|---|---|---|
| 3,810,874 A | 5/1974 | Mitsch et al. |
| 6,468,947 B1 | 10/2002 | Falcone et al. |
| 7,510,999 B2 | 3/2009 | Deng et al. |
| 2005/0277558 A1 | 12/2005 | Deng et al. |
| 2006/0052262 A1 | 3/2006 | Akada et al. |
| 2009/0318664 A1 | 12/2009 | Yang et al. |

FOREIGN PATENT DOCUMENTS

| | | |
|---|---|---|
| WO | 2003067285 A2 | 8/2003 |
| WO | 2014195299 A1 | 12/2014 |

OTHER PUBLICATIONS

Kasai PH; Raman V: "Perfluoropolyethers with dialkylamine end groups: ultrastable lubricant for magnetic disk application.", Tribology Letters, vol. 12, No. 2, Feb. 2002 (Feb. 1, 2002), pp. 117-122.
Tonelli, Claudio et al.: "Perfluoropolyether functional oligomers: unusual reactivity in organic chemistry", Journal of Fluorine Chemistry, vol. 118, 2002, pp. 107-121.

*Primary Examiner* — Sikarl A Witherspoon

(57) ABSTRACT

The present invention relates to novel (per)fluoropolyether polymers and their use as lubricants, in particular for Magnetic Recording Media (MRM).

9 Claims, No Drawings

(PER)FLUOROPOLYETHER POLYMERS

CROSS REFERENCE TO RELATED APPLICATIONS

This application is a U.S. national stage entry under 35 U.S.C. § 371 of International Application No. PCT/EP2016/066077 filed Jul. 7, 2016, which claims priority to European application No. 15175979.2 filed on Jul. 9, 2015. The entire contents of these applications are explicitly incorporated herein by this reference.

TECHNICAL FIELD

The present invention relates to novel (per)fluoropolyether polymers and their use as lubricant, in particular for Magnetic Recording Media (MRM).

BACKGROUND ART

Thin film Magnetic Recording Media (MRM), such as hard disks, are used to store large amounts of data and are typically composed of multiple layers, including a non-magnetic substrate having sequentially deposited on each side thereof an underlayer and at least one magnetic layer. A carbon overcoat is typically deposited over the magnetic recording layer to protect the recording layer from wear and environmental corrosion.

A thin layer of lubricant is applied over the protective carbon overcoat to improve the tribological performance of the hard disk drive, so as to improve the durability and reliability of a magnetic recording medium. To this aim, the liquid lubricant must adhere to the carbon overcoat such that the rotational velocity of the disk does not cause a significant amount of the lubricant to be lost from the disk surface.

(Per)fluoropolyethers (PFPEs) and derivatives thereof are currently used in the lubrication of MRM.

KASAI PH, Raman V. Perfluoropolyethers with dialkylamine end groups: ultrastable lubricant for magnetic disk application. *Tribology Letters*. February 2002, vol.12, no.2, p.117-122. disclose that perfluoropolyether molecular chains are prone to undergo the intramolecular disproportionation reaction, which is catalysed by Lewis acid and, in the head-disk environment, it occurs when the successive ether oxygen flanking a methylene unit (—$CF_2$—) come into contact with Lewis acid sites that may exist on the metal oxide surface.

However, it was shown that addition of X1P, partially fluorinated hexaphenoxy cyclotriphosphazene, markedly increases the durability of the magnetic disk system. The efficacy of X1P was attributed to the strong nucleophilic (Lewis base) nature of the triphosphazene ring. Accordingly, the above authors synthetized perfluoropolyethers with dialkylamine end groups of formula:

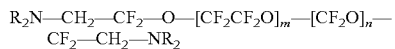

wherein —$NR_2$ was a group deriving from di-n-propylamine and morpholine. However, this article does not disclose perfluoropolyethers terminated with dialkylamine end groups wherein the alkyl chain is substituted with at least one hydroxyl group.

Hydroxy-terminated polymeric materials comprising a (per)fluoropolyether backbone have been disclosed for example in U.S. Pat. No. 3,810,874 (MINNESOTA MINING AND MANUFACTURING COMPANY) May 14, 1974, which relates to polyfunctional poly(perfluoroalkylen-oxides) and their preparation. Among the others, Example 1 provides a pre-polymer of formula (IV), wherein the alkyl chain bearing the hydroxy group is linked to the PFPE backbone through an amide moiety:

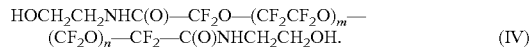

U.S. Pat. No. 6,468,947 (SEAGATE TECHNOLOGY LLC) discloses a lubricant composition comprising a first fluoropolyether and a decomposition inhibiting amount of a second fluoropolyether having at least one nitrogen containing group, in particular an amine or amide moiety. In particular, examples of the decomposition-inhibiting lubricants comprise a fluoropolyether chain substituted with one or two groups comprising an amide moiety and having the following formula:

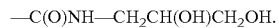

U.S. Pat. No. 7,510,999 (HITACHI GLOBAL STORAGE TECHNOLOGIES) discloses a lubricant composition comprising a first liquid lubricant and a second liquid lubricant, wherein the first liquid lubricant contains a cyclotriphosphazene ring attached to at least one perfluoropolyether having a single terminal hydroxyl group and the second liquid lubricant contains a perfluoropolyether having two end groups selected from hydroxyl, tertiary amine and combinations thereof.

The second liquid lubricant can have the following structure (IIb):

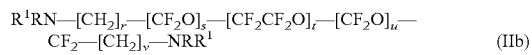

wherein R and $R^1$ are independently selected from —[$OCH_2CH_2$]$_y$OH, —$OCH_2CH(OH)CH_2OH$, —$CH_2CH_2OH$ and —$CH_2CH_2CH_3$ and wherein y is an integer from 1 to 6.

In particular, suitable second liquid lubricants have the following chemical structures ZDEA and ZEEA:

ZDEA:

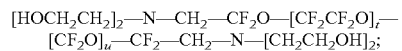

ZEEA:

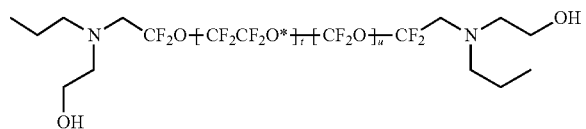

US 2006052262 (MATSUMURA OIL RESEARCH CORP.) discloses a compound of formula (I), a lubricant and a magnetic disk using the compound of formula (I):

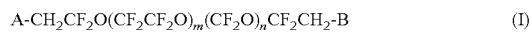

wherein A is amino group having hydroxyl group, B is hydroxyl group or amino group having or not having hydroxyl group, wherein m is a real number of 5 to 36 and n is a real number from 4 to 30.

US 2009/0318664 (SEAGATE TECHNOLOGY LLC.) discloses a compound comprising a backbone with a perfluoropolyether chain, one or more cyclophosphazene rings attached to or incorporated into the backbone.

WO 2014/195299 (SOLVAY SPECIALTY POLYMERS ITALY S.P.A.) discloses a method for manufacturing cyclophosphazenes PFPE derivatives to be used in lubrication of magnetic recording media (MRM), comprising the following steps:
1) 1) providing a mixture (M) containing:
a) a (per)fluoropolyether (PFPE) polyol [PFPE ($P_{pol}$)] comprising a fluoropolyoxyalkylene chain ($R_f$) having two chain ends, each chain end comprising at least one hydroxy group, and b) the corresponding alkoxide of perfluoropolyether ($P_{pol}$) [PFPE ($P_{alk}$)], wherein the equivalent concentration of PFPE ($P_{alk}$) in PFPE ($P_{pol}$) is lower than 30%, preferably ranging from 5% to 15%;
2) contacting mixture (M) with a perhalocyclophosphazene ($CP_{halo}$) to provide a mixture (M1) containing an equivalent ratio of PFPE ($P_{alk}$)/($CP_{halo}$) of at least 1;
3) allowing mixture (M1) to react until complete disappearance of P—Cl groups to provide a mixture (M2);
4) submitting mixture (M2) to hydrolysis to provide a mixture (M3);
5) optionally removing ($P_{pol}$) from mixture (M3) to provide a mixture (M4).

WO 03/067285 (CORNING INCORPORATED) discloses compounds having an aromatic or heteroaromatic moiety, at least two fluorinated alkylene, arylene or polyether moieties, each fluorinated alkylene, arylene or polyether moiety being linked to the aromatic or heteroaromatic moiety through an —O— or —S— linkage; at least one ethylenically unsaturated moiety, each ethylenically unsaturated moiety being linked to one of the fluorinated alkylene, arylene or polyether moieties.

US 2005/0277558 (HITACHI GLOBAL STORAGE TECHNOLOGIES NETHERLANDS B.V) discloses a lubricant composition for use as a lubricant for magnetic recording media, comprising a first liquid lubricant and a second liquid lubricant, wherein the first liquid lubricant contains a cyclotriphosphazene ring attached to at least one perfluoropolyether having a single terminal hydroxyl group, and the second liquid lubricant contains a perfluoropolyether having two end groups selected from hydroxyl, tertiary amine, and combinations thereof.

SUMMARY OF INVENTION

The Applicant has perceived that the industry of the magnetic recording media (MRM) is always looking for new polymers that can be used as lubricants, in particular in Magnetic Recording Media (MRM).

Thus, in a first aspect the present invention relates to a polymer [polymer (P)] comprising:
at least one (per)fluoropolyether chain [chain ($R_{pf}$)] and
at least one chain [chain (C)] comprising at least one hydroxy group and at least one group [group (H)] comprising a heteroatom selected from the elements belonging to group 15 of the periodic table,
provided that polymer (P) does not comprise amide group(s) and is different from a polymer of formula

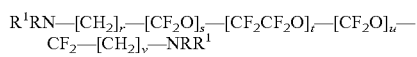
$CF_2$—$[CH_2]_v$—$NRR^1$ wherein
r, s, t, u and v are independently zero or an integer, with the proviso that s, t and u are not all zero, and
R and $R^1$ are independently selected from —$[OCH_2CH_2]_y$, OH, —$OCH_2CH(OH)CH_2OH$, —$CH_2CH_2OH$ and —$CH_2CH_2CH_3$.

More preferably, said heteroatom selected from the elements belonging to group 15 of the periodic table is nitrogen or phosphorous.

When the heteroatom is phosphorous, it is preferably phosphorous (III) and said at least one group (H) is a phosphino group and the polymer (P) will be hereinafter referred to as polymer ($P_P$).

When the heteroatom is nitrogen, it is preferably nitrogen (III) and said at least one group (H) is an amino group, more preferably a secondary or tertiary amino group, and the polymer (P) will be hereinafter referred to as polymer ($P_N$).

The Applicant has found that advantageously, when chain (C) comprises at least one heteroatom belonging to group 15 of the periodic table, said heteroatom retains its base properties and behaves as Lewis base, such that polymer (P) is less subject to the degradation process catalysed by the Lewis acids that may be present in the head-disk environment.

In addition, the presence of at least one hydroxy group in polymer (P) allows to increase the adhesion of the polymer itself to the magnetic layer or to the carbon overcoat of the MRM.

In a second aspect, the present invention relates to the use of polymer (P) as defined above as lubricant for magnetic recording media (MRM).

In a further aspect, the present invention relates to a method for lubricating a magnetic recording media (MRM), said method comprising providing a magnetic recording media (MRM) comprising at least one magnetic layer, optionally covered by at least one carbon overcoat, and applying at least one polymer (P) as defined above on said magnetic layer or on said carbon overcoat.

The Applicant has found that polymer (P) can be advantageously used as such as lubricant for MRM, i.e. without the need of adding any additive to polymer (P) to improve its durability performance. This results in at least two advantages: on the one hand, it avoids phase separation due to immiscibility between the different components of the composition to occur, as was the case when e.g. X1P was used as additive, and on the other hand it prevents undesired alterations of the lubricant composition over time.

DESCRIPTION OF EMBODIMENTS

For the purpose of the present description and of the following claims:
the use of parentheses around symbols or numbers identifying the formulae, for example in expressions like "polymer (P)", etc., has the mere purpose of better distinguishing the symbol or number from the rest of the text and, hence, said parenthesis can also be omitted;
the acronym "PFPE" stands for "(per)fluoropolyether" and, when used as substantive, is intended to mean either the singular or the plural from, depending on the context;
the term "(per)fluoropolyether" is intended to indicate fully or partially fluorinated polymer;
the expressions "5- to 10-membered aromatic moiety" and "5- or 6-membered aromatic moiety" indicate any cyclic ring derived from an aromatic compound and comprising from 5 to 10 members or 5 or 6 members in the cyclic ring, respectively;
the expression "aromatic moiety" indicates any cyclic ring derived from an aromatic compound;
the expression "aromatic compound" indicates any cyclic compound having a number of π electrons equal to 4n+2, wherein n is 0 or any positive integer, such as for example benzene, naphthalene, pyridine, quinoline, isoquinoline, pyrazine, pyrimidine, furan, benzofuran, pyrrole, indole, thiophene, benzothiophene, imidazole, benzimidazole, pyrazole, benzoxazole, isoxazole, benzisoxazole, thiazole, benzothiazole;

the term "alkylene" is intended to indicate a divalent alkyl chain and hence the expression "divalent alkyl chain" and the term "alkylene" are used as synonymous.

Preferably, said chain ($R_{pf}$) is a chain of formula —(CFX)$_a$ O($R_f$)(CFX')$_b$—, wherein a and b, equal or different from each other, are equal to or higher than 1, preferably from 1 to 10, more preferably from 1 to 3;

X and X', equal or different from each other, are —F or —CF$_3$, provided that when a and/or b are higher than 1, X and X' are —F;

($R_f$) comprises, preferably consists of, repeating units R°, said repeating units being independently selected from the group consisting of:

(i) —CFXO—, wherein X is F or CF$_3$;
(ii) —CFXCFXO—, wherein X, equal or different at each occurrence, is F or CF$_3$, with the proviso that at least one of X is —F;
(iii) —CF$_2$CF$_2$CW$_2$O—, wherein each of W, equal or different from each other, are F, Cl, H;
(iv) —CF$_2$CF$_2$CF$_2$CF$_2$O—;
(v) —(CF$_2$)$_j$—CFZ—O— wherein j is an integer from 0 to 3 and Z is a group of general formula —O—R$_{(f-a)}$-T, wherein R$_{(f-a)}$ is a fluoropolyoxyalkene chain comprising a number of repeating units from 0 to 10, said recurring units being chosen among the following : —CFXO—, —CF$_2$CFXO—, —CF$_2$CF$_2$CF$_2$O—, —CF$_2$CF$_2$CF$_2$CF$_2$O—, with each of each of X being independently F or CF$_3$ and T being a C$_1$-C$_3$ perfluoroalkyl group.

More preferably, a and b, equal or different from each other, are from 1 to 10, even more preferably from 1 to 3.

Preferably, chain ($R_f$) complies with the following formula:

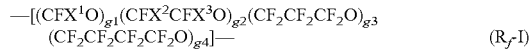  (R$_f$-I)

wherein

X$^1$ is independently selected from —F and —CF$_3$,
X$^2$, X$^3$, equal or different from each other and at each occurrence, are independently —F, —CF$_3$, with the proviso that at least one of X is —F;
g1, g2 , g3, and g4, equal or different from each other, are independently integers ≥0, such that g1+g2+g3+g4 is in the range from 2 to 300, preferably from 2 to 100; should at least two of g1, g2, g3 and g4 be different from zero, the different recurring units are generally statistically distributed along the chain.

More preferably, chain ($R_f$) is selected from chains of formula:

  (R$_f$-IIA)

wherein:
a1 and a2 are independently integers ≥0 such that the number average molecular weight is between 400 and 10,000, preferably between 400 and 5,000; both a1 and a2 are preferably different from zero, with the ratio a1/a2 being preferably comprised between 0.1 and 10;

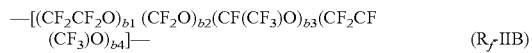  (R$_f$-IIB)

wherein:
b1, b2, b3, b4, are independently integers ≥0 such that the number average molecular weight is between 400 and 10,000, preferably between 400 and 5,000; preferably b1 is 0, b2, b3, b4 are >0, with the ratio b4/(b2+b3) being ≥1;

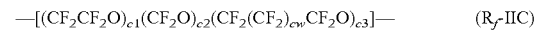  (R$_f$-IIC)

wherein:
cw=1 or 2;
c1, c2, and c3 are independently integers ≥0 chosen so that the number average molecular weight is between 400 and 10,000, preferably between 400 and 5,000; preferably c1, c2 and c3 are all >0, with the ratio c3/(c1+c2) being generally lower than 0.2;

  (R$_f$-IID)

wherein:
d is an integer >0 such that the number average molecular weight is between 400 and 10,000, preferably between 400 and 5,000;

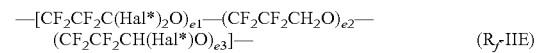  (R$_f$-IIE)

wherein:
Hal*, equal or different at each occurrence, is a halogen selected from fluorine and chlorine atoms, preferably a fluorine atom;
e1, e2, and e3 , equal to or different from each other, are independently integers ≥0 such that the (e1+e2+e3) sum is comprised between 2 and 300.

Still more preferably, chain ($R_f$) complies with formula ($R_f$-III) here below:

  (R$_f$-III)

wherein:
a1, and a2 are integers >0 such that the number average molecular weight is between 400 and 10,000, preferably between 400 and 5,000, with the ratio a1/a2 being generally comprised between 0.1 and 10, more preferably between 0.2 and 5.

Preferably, said chain (C) is a linear or branched alkyl chain comprising from 1 to 20, more preferably from 1 to 10 carbon atoms, optionally interrupted by a heteroatom selected from N, O, S and/or by a 5- to 10-membered, more preferably a 5- or 6-membered, aromatic moiety optionally comprising at least one heteroatom selected from N, O and S.

Preferably, said 5- to 10-membered aromatic moiety optionally comprising at least one heteroatom selected from N, O and S is an aromatic moiety deriving from benzene, naphthalene, pyridine, quinoline, isoquinoline, pyrazine, pyrimidine, furan, benzofuran, pyrrole, indole, thiophene, benzothiophene, imidazole, benzimidazole, pyrazole benzoxazole, isoxazole, benzisoxazole, thiazole, benzothiazole.

More preferably, said chain (C) is a linear or branched alkyl chain comprising from 1 to 6 carbon atoms.

In a preferred embodiment, said chain ($R_{pf}$) and the at least one heteroatom of said group (H) are linked together via a bridging group [group (B)].

Preferably, group (B) is a divalent alkyl chain comprising from 1 to 20, more preferably from 1 to 10 carbon atoms, said alkyl chain being optionally interrupted by at least one oxygen atom and/or optionally substituted with at least one hydroxy group and/or with a perfluoroalkyl group comprising from 1 to 3 carbon atoms.

More preferably, group (B) is a chain of formula —CH(CF$_3$)— or —CH$_2$(OCH$_2$CH$_2$)$_n$ wherein n is 0 or an integer from 1 to 10, more preferably from 1 to 5.

In a preferred embodiment, polymer (P$_N$) comprises:
one (per)fluoropolyether chain [chain (R$_{pf}$)] and at least one chain [chain (C)] comprising at least one hydroxy group and at least one amino group, wherein said chain ($R_{pf}$) is a chain of formula —(CFX)$_a$O(R$_f$)(CFX')$_b$—, wherein X, X', a and b are as defined above and (R$_f$) comprises, preferably consists of, repeating units R°, said repeating units being independently selected from the group consisting of:

(i-a) —CF(CF$_3$)O—;

(ii-a) —CFXCFXO—, wherein X, equal or different at each occurrence, is F or CF$_3$, with the proviso that at least one of X is —CF$_3$;

(iii-a) —CF$_2$CF$_2$CF$_2$O—;

(iv-a) —CF$_2$CF$_2$CF$_2$CF$_2$O—;

(v-a) —(CF$_2$)$_j$—CFZ—O— wherein j is an integer from 0 to 3 and Z is a group of general formula —O—R$_{(f-a)}$-T, wherein R$_{(f-a)}$ is a fluoropolyoxyalkene chain comprising a number of repeating units from 0 to 10, said recurring units being chosen among the following: —CFXO—, —CF$_2$CFXO—, —CF$_2$CF$_2$CF$_2$O—, —CF$_2$CF$_2$CF$_2$CF$_2$O—, with each of each of X being independently F or CF$_3$ and T being a C$_1$-C$_3$ perfluoroalkyl group.

Preferably, in polymer (P$_N$), said chain (R$_{pf}$) and the nitrogen atom of said at least one amino group are linked together via a bridging group [group (B)], as defined above.

Preferably, polymer (P$_N$) comprises two chains (C) as defined above, each of said chains (C) being bonded to the opposite side of said chain (R$_{pf}$) via a bridging group (B) as defined above.

More preferably, polymer (P$_N$) complies with the following formula:

T-(R$_{pf}$)—(B)—(C)

wherein C, B and R$_{pf}$ are as defined above and

T is selected from the group comprising —H, —F, —Cl, a straight or branched perfluoroalkyl group comprising from 1 to 3 carbon atoms, or a chain —(B)—(C) wherein (B) and (C) are as defined above.

In a more preferred embodiment according to the present invention, polymer (P$_N$*) comprises at least two chains (R$_{pf}$) as defined above, each chain (R$_{pf}$) having two chain ends, wherein:

said at least two chains (R$_{pf}$) are linked together at one chain end through a divalent chain [chain (*C*)] comprising at least one hydroxy group and at least two amino groups, at least one of said at least two chains (R$_{pf}$) bears on its opposite chain end a monovalent chain [chain (C*)] comprising at least one hydroxy group and at least one amino group.

Preferably, in polymer (P$_N$*), said chains (R$_{pf}$) are bonded to the nitrogen atom of the amino groups of chain (*C*) and of chain (C*) via a group (B) as defined above.

Preferably, said chain (C*) is a linear or branched alkyl chain comprising from 1 to 20 carbon atoms, said alkyl chain being optionally interrupted by one or more heteroatoms and being optionally substituted with a 5- to 10-membered aromatic moiety; or a 5- to 10-membered aromatic moiety optionally substituted with a linear or branched alkyl chain comprising from 1 to 6 carbon atoms.

More preferably, said chain (C*) complies with formula (C*-I):

—N(R$_1$)(R$_2$) (C*-I)

wherein

R$_1$ and R$_2$, identical or different from each other, are hydrogen; a linear or branched alkyl chain comprising from 1 to 10, more preferably from 1 to 6, carbon atoms, said alkyl chain being optionally substituted with a 5- to 10-membered aromatic moiety, said alkyl chain and/or said aromatic moiety being substituted with at least one hydroxy group; a 5- to 10-membered aromatic moiety optionally substituted with a linear or branched alkyl chain comprising from 1 to 6 carbon atoms, said aromatic moiety and/or said alkyl chain being substituted with at least one hydroxy group;

provided that at least one of R$_1$ and R$_2$ is different from hydrogen.

More preferably, R$_1$ and R$_2$, identical or different from each other, are hydrogen; a linear or branched alkyl chain comprising from 1 to 6 and more preferably from 1 to 3 carbon atoms and at least one hydroxy group; a 5- or 6-membered aromatic moiety optionally substituted with a linear or branched alkyl chain comprising from 1 to 3 carbon atoms, wherein at least one of said aromatic moiety and of said alkyl chain comprises at least one hydroxy group.

Preferably, R$_1$ and R$_2$, identical or different from each other, are selected from hydrogen, —CH$_2$OH, —CH$_2$CH$_2$OH, —CH$_2$CH$_2$CH$_2$OH, —CH$_2$—CH(CH$_3$)(OH), —CH(CH$_2$OH)$_2$, —CH$_2$—CH(OH)—CH$_2$OH, —C(CH$_2$OH)$_3$, —C(CH$_3$)(CH$_2$OH)$_2$, —C(CH$_3$)$_2$(CH$_2$OH),

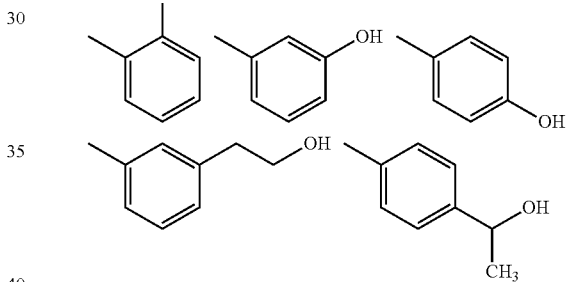

Preferably, said chain (*C*) is a linear or branched alkyl chain comprising from 1 to 10, more preferably from 1 to 6 carbon atoms, and being optionally interrupted by at least one heteroatom selected from N, O and S and/or by a 5- to 10-membered, more preferably a 5- or 6-membered aromatic moiety optionally comprising one or more heteroatoms and optionally substituted with a linear or branched alkyl chain comprising from 1 to 6 carbon atoms, said aromatic moiety and/or said alkyl chain being optionally substituted with at least one hydroxy group.

More preferably, said chain (*C*) complies with the following formula (*C*-I):

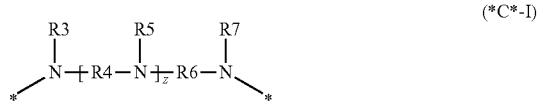

wherein

R$_3$, R$_5$ and R$_7$, equal to or different from each other, are independently selected from hydrogen; linear or branched alkyl chain comprising from 1 to 10, preferably from 1 to 6 carbon atoms; and a 5- to 10-membered aromatic moiety optionally comprising at least one heteroatom selected from N, O and S and optionally substituted with a linear or branched alkyl chain comprising from 1 to 6 carbon atoms, said alkyl chain and/or said aromatic moiety optionally comprising at least one hydroxy group;

$R_4$ and $R_6$, equal to or different from each other, are independently a linear or branched alkylene chain comprising from 1 to 10, preferably from 1 to 6 carbon atoms, said alkylene chain being optionally substituted with at least one hydroxy group and/or optionally interrupted by one or more heteroatoms selected from N, O and S and/or by a 5- to 10-membered aromatic moiety optionally comprising at least one heteroatom selected from N, O and S; and z is 0 or an integer equal to or higher than 1, more preferably 0 or an integer from 1 to 20;

provided that at least one of $R_3$, $R_4$, $R_5$, $R_6$ or $R_7$ comprises at least one hydroxy group.

Even more preferably, z is 0.

Even more preferably, $R_3$ and $R_7$ equal to or different from each other, are independently selected from hydrogen, linear or branched alkyl chain comprising from 1 to 6 carbon atoms.

Even more preferably, $R_6$ is a linear or branched alkylene chain comprising from 1 to 6 carbon atoms, said alkyl chain being optionally substituted with at least one hydroxy group and/or by a 5- or 6-membered aromatic moiety;

provided that at least one of $R_3$, $R_6$ or $R_7$ comprises at least one hydroxy group.

Examples of said chain (*C*) are the following:

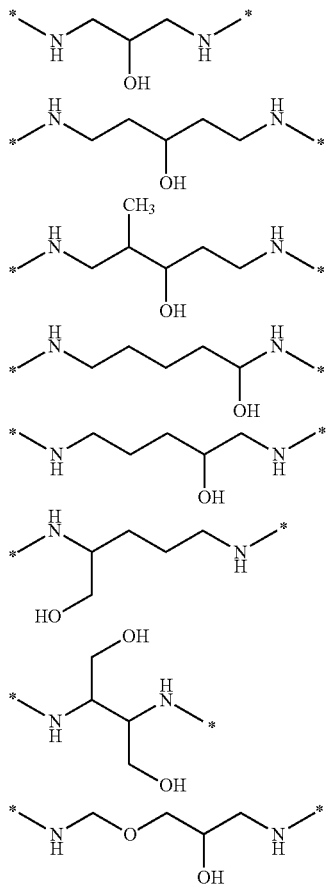

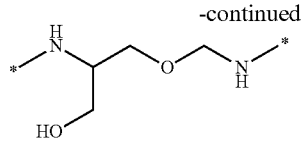

wherein the symbol (*) indicates the bond to chain ($R_{pf}$).

More preferably, polymer ($P_N$*) comprises two chains ($R_{pf}$) as defined above and chain (*C*) comprises two amino groups.

In a more preferred embodiment, polymer ($P_N$*) complies with the following formula (P-I):

$$T-(R_{pf})-(B^*)-(^*C^*)-(B^*)-(R_{pf})-(B^*)-(C^*) \qquad (P\text{-}I)$$

wherein ($R_{pf}$), (B*), (*C*) and (C*) are as defined above and

T is selected from the group comprising —H, —F, —Cl, a straight or branched perfluoroalkyl group comprising from 1 to 3 carbon atoms, or chain —(B*)—(C*) wherein (B*) and (C*) are as defined above.

More preferably, T is chain —(B*)—(C*).

Polymer (P) according to the present invention can be conveniently prepared using processes known to the skilled persons.

Good results have been obtained starting from PFPE alcohols, i.e. polymers comprising a fully or partially fluorinated polyether chain ($R_f$) having at least two chain ends, preferably two chain ends, wherein at least one chain end bears at least one hydroxy group.

Thus, a further aspect of the present invention relates to a process [process $P_N$] for the manufacture of polymer ($P_N$), said process comprising the following steps:
(a) providing at least one PFPE alcohol,
(b) reacting said PFPE alcohol with a compound bearing at least one sulfonic group to obtain a sulfonic PFPE ester,
(c) reacting the sulfonic PFPE ester obtained in step (b) with at least one organic amine to obtain polymer ($P_N$).

Suitable PFPE alcohols can be obtained according to methods known in the art and are commercially available, for example from Solvay Specialty Polymers Italy S.p.A. under the trade name Fomblin®.

Preferably, step (b) is performed according to methods known in the art, for example as disclosed by TONELLI, Claudio, et al. Perfluoropolyether functional oligomers: unusual reactivity in organic chemistry. *Journal of Fluorine Chemistry*. 2002, vol.118, p.107-121, in particular as reported on page 119 paragraph 3.5.4.1.

Preferably, said step (b) is performed at a temperature below 0° C., more preferably from −5° C. to −50° C., even more preferably from −10° C. to −25° C.

Preferred compounds bearing at least one sulfonic group are selected in the group comprising alkane-sulfonyl halides, such as methanesulfonyl chloride; aromatic sulfonyl halides, such as p-toluenesulfonyl chloride; perfluoroalkane-sulfonyl halides such as trifluoromethanesulfonyl chloride and perfluoro-1-butanesulfonyl fluoride. Perfluoro-1-butanesulfonyl fluoride is particularly preferred.

Preferably, step (c) is performed in the presence of an excess of sulfonic PFPE ester.

Preferably, step (c) is performed in the presence of a suitable solvent, typically selected from perfluorocarbons (PFCs), hydrofluorocarbons (HFCs), hydrofluoroethers (HFEs) and 1,3-bis(trifluoromethyl)benzene. The preferred solvent being 1,3-bis(trifluoromethyl)benzene.

Preferably, the organic amine used in step (c) is an organic aliphatic or aromatic compound comprising at least one primary or secondary amine group.

Said organic amine is a monoamine, i.e. an amine comprising one primary or one secondary amine group, or a polyamine, i.e. an amine comprising at least two primary or secondary amine groups or a combination thereof.

More preferably, said aliphatic organic amine comprises a linear or branched alkyl chain having from 1 to 10, more preferably from 1 to 6 carbon atoms, said alkyl chain comprising at least one hydroxy group.

More preferably, said aromatic organic amine comprises a 5- to 10-membered, more preferably a 6- to 10-membered, aromatic moiety, optionally comprising one or more heteroatoms selected from N, O and S, said aromatic moiety being optionally substituted with an alkyl chain comprising from 1 to 6 carbon atoms, said aromatic moiety and/or said alkyl chain being substituted with one hydroxy group.

A preferred monoamine to be used in process ($P_N$) can be represented with formula (A-m):

$$HN(R_1)(R_2) \quad (A\text{-}m)$$

wherein $R_1$ and $R_2$ are as defined above.

Examples of suitable aliphatic and aromatic monoamines that can be used in process ($P_N$) include—without being limited thereto—those represented in the following group (M-I):

(M-I) $NH_2CH_2OH$, $NH(CH_2OH)_2$, $NH_2CH_2CH_2OH$, $NH(CH_2CH_2OH)_2$, $NH_2CH_2CH_2CH_2OH$, $NH(CH_2CH_2CH_2OH)_2$, $NH_2CH_2$—$CH(CH_3)(OH)$, $NH_2CH(CH_2OH)_2$, $NH_2CH_2$—$CH(OH)$—$CH_2OH$, $NH_2C(CH_2OH)_3$, $NH_2C(CH_3)(CH_2OH)_2$, $NH_2C(CH_3)_2(CH_2OH)$, $NH[CH_2$—$CH(CH_3)(OH)]_2$, $NH[CH(CH_2OH)_2]_2$, $NH[CH_2$—$CH(OH)$—$CH_2OH]_2$, $NH[C(CH_2OH)_3]_2$, $NH[C(CH_3)(CH_2OH)_2]_2$, $NH[C(CH_3)_2(CH_2OH)]_2$, $HOCH_2CH_2$—$NH$—$C(CH_2OH)_3$,

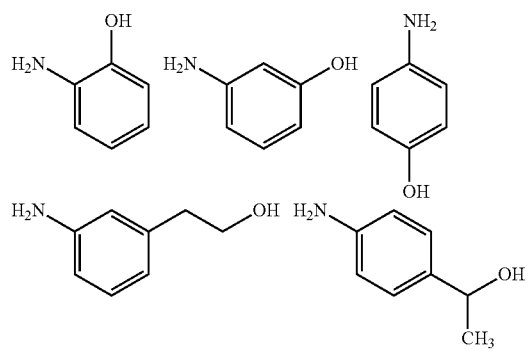

A preferred polyamine to be used in process ($P_N$) complies with the following formula (A-p):

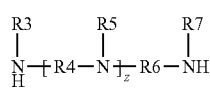

(A-p)

wherein:
z, $R_3$, $R_4$, $R_5$, $R_6$ and $R_7$ are as defined above.
Even more preferably, z is 0.
Even more preferably, $R_3$ and $R_7$ equal to or different from each other, are independently selected from hydrogen, linear or branched alkyl chain comprising from 1 to 6 carbon atoms.

Even more preferably, $R_6$ is a linear or branched alkylene chain comprising from 1 to 6 carbon atoms, said alkyl chain being optionally substituted with at least one hydroxy group and/or by a 5- or 6-membered aromatic moiety;

provided that at least one of $R_3$, $R_6$ or $R_7$ comprises at least one hydroxy group.

In a preferred embodiment, said polyamine is a diamine.
Examples of suitable aliphatic diamines are represented in the following group (D-I):

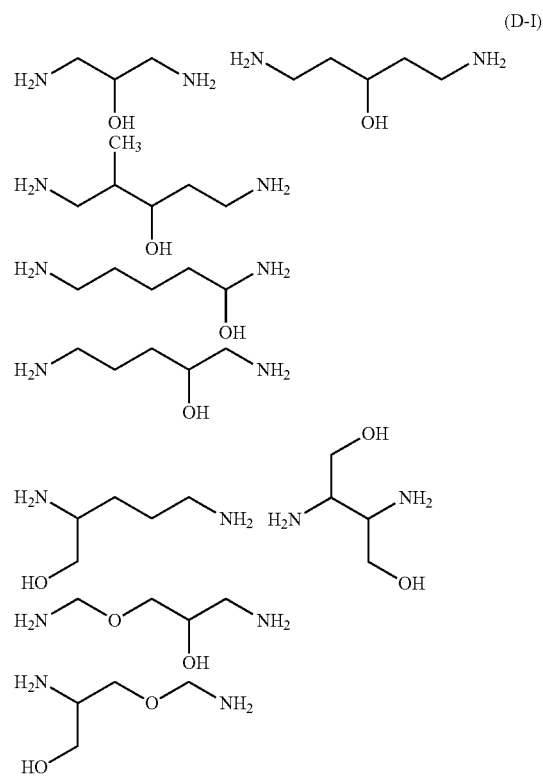

(D-I)

As an alternative process, polymer ($P_N$) can be prepared by reacting a PFPE ester, i.e. a polymer comprising a fully or partially fluorinated polyether chain ($R_f$) having at least two chain ends, preferably two chain ends, wherein at least one chain end bears at least one ester group, with a suitable organic amine as disclosed above to obtain the corresponding PFPE-amide, and then reducing said PFPE-amide by using a suitable reducing agent to the corresponding polymer ($P_N$).

In a further aspect, the present invention relates to a process [process $P_N^*$] for the manufacture of polymer ($P_N^*$) as defined above comprising the following steps:
(a*) providing at least one PFPE alcohol,
(b*) reacting said PFPE alcohol with a compound bearing at least one sulfonic group to obtain a sulfonic PFPE ester,
(c*) reacting the sulfonic PFPE ester obtained in step (b) with at least one polyamine to obtain a PFPE-oligomer comprising at least two chains ($R_{pf}$),
(d*) optionally purifying the PFPE-oligomer obtained in step (c),
(e*) reacting said PFPE-oligomer with at least one monoamine to obtain polymer ($P_N^*$).

Advantageously, the PFPE alcohol is as defined above with respect to process ($P_N$).

Preferably, step (b*) is performed under the same conditions and using the same reagents disclosed above for step (b).

Preferably, the polyamine in step (c*) complies with formula (A-p) above. More preferably, the polyamine is a diamine, such as for example one of those represented above in group (D-I).

Preferably, step (c*) is performed in the presence of a suitable solvent, typically selected from those listed above with respect to step (c).

In a preferred embodiment, the PFPE-oligomer obtained in step (c*) comprises two chains ($R_{pf}$) and hence it is referred to as "PFPE-dimer".

To this aim, step (c*) is performed in the presence of an excess of sulfonic PFPE ester.

Preferably, said step (d*) is performed for example by chromatography, including for example column chromatography, flash column chromatography, and supercritical chromatography, solubility fractionation and fractional distillation.

Preferably, said step (d*) is performed by column chromatography or by supercritical chromatography.

Preferably, when step (d*) is performed by column chromatography, suitable solvents can be selected for example in the group comprising fluorinated or partially fluorinated solvents, such as hexafluoroxylene; hydrofluoroethers, including methoxy nonafluorobutane (Novec™ HFE-7100 commercially available from 3M, U.S.A.), ethoxy nonafluorobutane; and mixtures thereof. These solvents can be optionally used in admixture with a solvent selected from the group comprising polar aprotic solvents, such as acetonitrile, dimethylformamide, dimethylacetamide, dimethylsulfoxide, acetone, dichloromethane and tetrahydrofuran.

Preferably, when step (d*) is performed by supercritical chromatography, a solvent such as $CO_2$ is preferably used, optionally in admixture with a polar solvent such as methanol or ethanol.

Preferably, the organic amine in step (e*) is a monoamine complying with formula (A-m) above, and more preferably it is selected among those listed in group (M-I) above.

Preferably, said step (e*) is performed in the presence of a suitable solvent, typically selected from those listed above with respect to step (c).

Magnetic Recording Media (MRM) typically comprise multiple layers, including a non-magnetic substrate having sequentially deposited on each side thereof an underlayer, at least one magnetic layer and a protective overcoat, preferably a carbon overcoat.

In a preferred embodiment, polymer ($P_N$), and even more preferably polymer ($P_N$*), as defined above is used as lubricant for MRM.

The step of applying a polymer according to the present invention to the MRM can be performed by any conventional method known in the art.

For example, polymer (P) can be directly applied on the magnetic layer, or on the protective overcoat if present, of the disk of the MRM.

Alternatively, polymer (P) can be first dissolved in a suitable solvent, such as hydrofluoroethers (HFEs) for example Novec™ HFEs (commercially available from 3M™), hydrofluorocarbons (HFCs) for example Vertrel® HFCs (commercially available from DuPont™), perfluorinated hydrocarbons, chlorofluorocarbons, hydrochlorofluorocarbons and combinations thereof, thus obtaining a solution [solution (S)], then the disk is submerged in said solution (S) and slowly withdrawn therefrom.

A conventional lifter-type dipper may be used to submerge the disk of the recording medium in said solution (S).

Optionally, the coated disk thus obtained is subjected to further treatments, such as for example exposure to UV radiation.

The skilled person can optimize the duration of submergence and the speed of withdrawal to achieve a desired coating thickness.

Preferably, the coating comprising any one of polymer (P) according to the present invention has a thickness from about 2 to about 30 angstroms (Å), more preferably from 2 to 15 Å.

Should the disclosure of any patents, patent applications and publications which are incorporated herein by reference conflict with the description of the present application to the extent that it may render a term unclear, the present description shall take precedence.

The invention will be herein after illustrated in greater detail by means of the Examples contained in the following Experimental Section; the Examples are merely illustrative and are by no means to be interpreted as limiting the scope of the invention.

EXPERIMENTAL SECTION

Example 1

Step 1—Synthesis of ZDOL Nonaflate 154 g of perfluoro-1-butanesulfonyl fluoride ($CF_3CF_2CF_2SO_2F$ —96%, 489 mmol) and 54 g of triethylamine (TEA—534 mmol) were placed in a 1000-ml round-bottom flask equipped with mechanical stirrer, dropping funnel, thermometer and condenser. After the temperature was cooled down, 175 g of Fomblin® ZDOL PFPE (EW=431, 406 meq) were added through the dropping funnel during about 2 hours while keeping the reaction mixture under stirring and the temperature at −15/−20° C. After the addition was completed the cooling bath was removed and the reaction mixture was allowed to warm to room temperature. $^{19}$F-NMR showed a quantitative conversion of Fomblin® ZDOL PFPE into the corresponding nonaflate derivative.

The mixture was then added with 100 g of Galden® D100 (mixture 1:1 by weight of perfluoropropyltetrahydropyran and perfluorobutyltetrahydro-furan), 76 g of methyl alcohol and vigorously shaken.

After phase separation, the lower organic layer was collected and washed two times with 70 g of methyl alcohol. Every time the resulting two phases were vigorously stirred at room temperature for a few minutes and, after separation, the lower organic layer was collected. The solvents were then removed by distillation at 80° C. under reduced pressure to afford 278 g ZDOL nonaflate of formula:

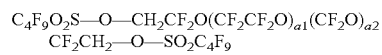

wherein the ratio a1/a2 was about 1.

Step 2—Reaction Between ZDOL Nonaflate and 1,3-diamino-2-propanol 275 g of ZDOL nonaflate (EW=716, 384 meq) obtained as described in Step 1 above, 150 g of 1,3-bis(trifluoromethyl)benzene (HFX) and 20 g of potassium carbonate (145 mmol) were placed in a 500-ml round-bottom flask equipped with mechanical stirrer, dropping funnel, thermometer and condenser. After heating at reflux, a solution of 1,3-diamino-2-propanol (2 g, 22 mmol) in tent-butanol (18 g) was added drop-wise under vigorous stirring during 3 hours.

After further 4 hours of reaction under stirring a complete conversion was achieved, as confirmed by $^1$H-NMR and $^{19}$F-NMR.

After cooling down to room temperature, the mass was filtered through a 0.45 μm PTFE membrane, the filtrate (472 g) collected and stripped of solvents under vacuum at 80° C. 265 g of crude product were obtained, containing unreacted ZDOL nonaflate used in excess and the desired compound having the following formula:

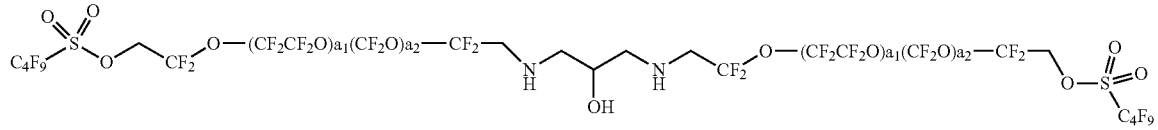

Step 3—Isolation of the Target Compound by Silica Column Chromatography

The crude product obtained in step 2 above (265 g) was chromatographed over a 56 mm diameter column filled with silica (280 g, particle size between 200 and 500 μm).

The excess of ZDOL nonaflate was eluted first by 1953 g of Novec™ HFE-7100 and recovered (220 g) after solvent removal.

The target product was then recovered by eluting with increasing concentrations of acetonitrile in Novec™ HFE-7100 (2 to 5% w/w).

Step 4—Reaction with Diethanolamine 23 g of the target product (EW=1167, 19.7 meq) obtained as disclosed in Step 3 above, 20 g of HFX and 8.8 g of diethanolamine (99.5%, 83.3 mmol) were placed in a 50-ml round-bottom flask equipped with mechanical stirrer, thermometer and condenser. The reaction mixture was vigorously stirred at reflux until complete conversion (monitored by $^{19}$F NMR).

After cooling down to room temperature and phase separation, the lower organic layer was washed with 20 g distilled water and 6 g isobutyl alcoholfor two times.

After phase separation, the lower organic layer was collected and the solvents were removed by distillation at 80° C. under reduced pressure, thus obtaining 15 g of the product having the following structure: $(HOCH_2CH_2)_2N-CH_2-CF_2O(R_f)CF_2-CH_2-NHCH_2CH(OH)CH_2NH-CH_2-CF_2O(R_f)CF_2-CH_2-N(CH_2CH_2OH)_2$
wherein
$(R_f)$ is $-(CF_2CF_2O)_{a1}(CF_2O)_{a2}-$ and the ratio a1/a2 is about 1.

The invention claimed is:

1. A polymer (P), wherein polymer (P) is selected from the group consisting of:
   polymers $(P_N)$ comprising:
     one (per)fluoropolyether chain $(R_{pf})$ and
     at least one chain (C) comprising at least one hydroxy group and at least one amino group,
       wherein chain $(R_{pf})$ is a chain of formula $-(CFX)_aO(R_f)(CFX')_b-$, wherein
       a and b, equal or different from each other, are equal to or higher than 1;
       X and X', equal or different from each other, are —F or —CF$_3$, provided that when a and/or b are higher than 1, X and X' are —F; and
       $(R_f)$ comprises repeating units R°, said repeating units being independently selected from the group consisting of:
         (i-a) —CF(CF$_3$)O—;
         (ii-a) —CFXCFXO—, wherein X, equal or different at each occurrence, is F or CF$_3$, with the proviso that at least one of X is —CF$_3$;
         (iii-a) —CF$_2$CF$_2$CF$_2$O—;
         (iv-a) —CF$_2$CF$_2$CF$_2$CF$_2$O—;
         (v-a) —(CF$_2$)$_j$—CFZ—O— wherein j is an integer from 0 to 3 and Z is a group of general formula —O—R$_{(f-a)}$—T, wherein R$_{(f-a)}$ is a fluoropolyoxyalkene chain comprising a number of repeating units from 0 to 10, said recurring units being selected from: —CFXO—, —CF$_2$CFXO—, —CF$_2$CF$_2$CF$_2$O—, —CF$_2$CF$_2$CF$_2$CF$_2$O—, with each of each of X being independently F or CF$_3$ and T being a C$_1$—C$_3$ perfluoroalkyl group; and
   polymers $(P_N^*)$ comprising
     at least two (per)fluoropolyether chains $(R_{pf})$, each chain $(R_{pf})$ having two chain ends, wherein:
       said at least two chains $(R_{pf})$ are linked together at one chain end through a divalent chain (*C*) comprising at least one hydroxy group and at least two amino groups, and
       at least one of said at least two chains $(R_{pf})$ bears on its opposite chain end a monovalent chain (C*) comprising at least one hydroxy group and at least one amino group; and
       wherein each chain $(R_{pf})$ is independently a chain of formula $-(CFX)_aO(R_f)(CFX')_b-$, wherein
       a and b, equal or different from each other, are equal to or higher than 1;
       X and X', equal or different from each other, are —F or —CF$_3$, provided that when a and/or b are higher than 1, X and X' are —F;
       $(R_f)$ comprises repeating units R°, said repeating units being independently selected from the group consisting of:
         (i) —CFXO—, wherein X is F or CF$_3$;
         (ii) —CFXCFXO—, wherein X, equal or different at each occurrence, is F or CF$_3$, with the proviso that at least one of X is —F;
         (iii) —CF$_2$CF$_2$CW$_2$O—, wherein each of W, equal or different from each other, is F, Cl, or H;
         (iv) —CF$_2$CF$_2$CF$_2$CF$_2$O—; and
         (v) —(CF$_2$)$_j$—CFZ—O— wherein j is an integer from 0 to 3 and Z is a group of general formula —O—R$_{(f-a)}$—T, wherein R$_{(f-a)}$ is a fluoropolyoxyalkene chain comprising a number of repeating units from 0 to 10, said recurring units being selected from: —CFXO—, —CF$_2$CFXO—, —CF$_2$CF$_2$CF$_2$O—, —CF$_2$CF$_2$CF$_2$CF$_2$O—, with each of each of X being independently F or CF$_3$ and T being a C$_1$—C$_3$ perfluoroalkyl group.

2. The polymer (P) according to claim 1, wherein in said polymer $(P_N^*)$, said chains $(R_{pf})$ are bonded to the nitrogen atom of the amino groups of chain (*C*) and of chain (C*) via a group (B), said group (B) being a divalent alkyl chain comprising from 1 to 20 carbon atoms, said alkyl chain being optionally interrupted by at least one oxygen atom and/or optionally substituted with at least one hydroxy group and/or with a perfluoroalkyl group comprising from 1 to 3 carbon atoms.

3. The polymer (P) according to claim 1, wherein said polymer ($P_N^*$) comprises two chains ($R_{pf}$) and chain (*C*) comprises two amino groups.

4. The polymer (P) according to claim 1, said polymer ($P_N^*$) complying with the following formula (P-I):

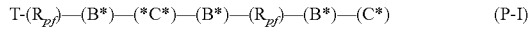

T-($R_{pf}$)—(B*)—(*C*)—(B*)—($R_{pf}$)—(B*)—(C*)  (P-I)

wherein
($R_{pf}$) is a chain of formula —(CFX)$_a$O($R_f$)(CFX')$_b$—;
wherein
a and b, equal or different from each other, are equal to or higher than 1;
X and X', equal or different from each other, are —F or —CF$_3$, provided that when a and/or b are higher than 1, X and X' are —F;
($R_f$) comprises repeating units R°, said repeating units being independently selected from the group consisting of:
(i) —CFXO—, wherein X is F or CF$_3$;
(ii) —CFXCFXO—, wherein X, equal or different at each occurrence, is F or CF$_3$, with the proviso that at least one of X is —F;
(iii) —CF$_2$CF$_2$CW$_2$O—, wherein each of W, equal or different from each other, are F, Cl, H;
(iv) —CF$_2$CF$_2$CF$_2$CF$_2$O—; and
(v) —(CF$_2$)$_j$—CFZ—O— wherein j is an integer from 0 to 3 and Z is a group of general formula —O—R$_{(f-a)}$—T, wherein R$_{(f-a)}$ is a fluoropolyoxyalkene chain comprising a number of repeating units from 0 to 10, said recurring units being selected from: —CFXO—, —CF$_2$CFXO—, —CF$_2$CF$_2$—, —CF$_2$CF$_2$CF$_2$O—, with each of each of X being independently F or CF$_3$ and T being a C$_1$—C$_3$ perfluoroalkyl group
(B*) is a divalent alkyl chain comprising from 1 to 20 carbon atoms, said alkyl chain being optionally interrupted by at least one oxygen atom and/or optionally substituted with at least one hydroxy group and/or with a perfluoroalkyl group comprising from 1 to 3 carbon atoms;
(*C*) is a linear or branched alkyl chain comprising from 1 to 10 carbon atoms, and being optionally interrupted by at least one heteroatom selected from N, O and S and/or by a 5- to 10-membered aromatic moiety optionally comprising one or more heteroatoms and optionally substituted with a linear or branched alkyl chain comprising from 1 to 6 carbon atoms, said aromatic moiety and/or said alkyl chain being optionally substituted with at least one hydroxy group;
(C*) is a linear or branched alkyl chain comprising from 1 to 20 carbon atoms, said alkyl chain being optionally interrupted by one or more heteroatoms and being optionally substituted with a 5- to 10-membered aromatic moiety, or a 5- to 10-membered aromatic moiety optionally substituted with a linear or branched alkyl chain comprising from 1 to 6 carbon atoms, wherein said alkyl chain or said a 5- to 10-membered aromatic moiety further comprising at least one hydroxy group and at least one amino group; and
T is selected from the group comprising —H, —F, —Cl, a straight or branched perfluoroalkyl group comprising from 1 to 3 carbon atoms, and chain —(B*)—(C*).

5. A process for the manufacture of polymer ($P_N$) according to claim 1, said process comprising:
reacting at least one PFPE alcohol with a compound bearing at least one sulfonic group to obtain a sulfonic PFPE ester, and
reacting the sulfonic PFPE ester with at least one organic amine to obtain polymer ($P_N$).

6. The process according to claim 5, wherein the organic amine is an organic aliphatic or aromatic compound comprising at least one primary or secondary amine group.

7. A process for the manufacture of at least one polymer ($P_N^*$) according to claim 1, said process comprising:
reacting at least one PFPE alcohol with a compound bearing at least one sulfonic group to obtain a sulfonic PFPE ester,
reacting the sulfonic PFPE ester with at least one polyamine to obtain a PFPE- oligomer comprising at least two chains ($R_{pf}$),
optionally purifying the PFPE-oligomer, and
reacting the PFPE-oligomer with at least one monoamine to obtain polymer ($P_N^*$).

8. The process of claim 7, wherein reacting the sulfonic PFPE ester with at least one polyamine is performed in the presence of an excess of sulfonic PFPE ester.

9. A lubricant for magnetic recording media (MRM) comprising at least one polymer (P) according to claim 1.

* * * * *